United States Patent
Appleton et al.

(10) Patent No.: US 8,176,160 B2
(45) Date of Patent: May 8, 2012

(54) NETWORK MANAGEMENT SYSTEM ACCELERATED EVENT CHANNEL

(75) Inventors: Chris Appleton, Erith (GB); Kristian Stewart, Middlesex (GB)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 11/855,179

(22) Filed: Sep. 14, 2007

(65) Prior Publication Data

US 2009/0077212 A1 Mar. 19, 2009

(51) Int. Cl.
*G06F 15/173* (2006.01)
*G60F 15/16* (2006.01)

(52) U.S. Cl. .................. 709/223; 709/203; 709/207

(58) Field of Classification Search .............. 709/217, 709/219, 223, 203, 207
See application file for complete search history.

(56) References Cited

U.S. PATENT DOCUMENTS

| Patent | | Date | Inventor | Cite |
|---|---|---|---|---|
| 5,942,986 A * | | 8/1999 | Shabot et al. | 340/7.29 |
| 6,131,112 A | | 10/2000 | Lewis et al. | |
| 6,553,336 B1 * | | 4/2003 | Johnson et al. | 702/188 |
| 6,647,432 B1 * | | 11/2003 | Ahmed et al. | 719/318 |
| 6,661,345 B1 * | | 12/2003 | Bevan et al. | 340/575 |
| 6,694,336 B1 * | | 2/2004 | Multer et al. | 707/201 |
| 6,757,710 B2 * | | 6/2004 | Reed | 709/203 |
| 6,845,370 B2 * | | 1/2005 | Burkey et al. | 707/3 |
| 6,898,591 B1 * | | 5/2005 | Moon et al. | 707/3 |
| 7,007,104 B1 | | 2/2006 | Lewis et al. | |
| 7,032,011 B2 * | | 4/2006 | Woodard et al. | 709/220 |
| 7,106,460 B2 * | | 9/2006 | Haines et al. | 358/1.12 |
| 7,310,111 B2 * | | 12/2007 | Ramirez-Diaz et al. | 348/159 |
| 2002/0032722 A1 * | | 3/2002 | Baynes et al. | 709/202 |
| 2002/0085696 A1 * | | 7/2002 | Martin et al. | 379/201.03 |
| 2005/0132231 A1 * | | 6/2005 | Williamson et al. | 713/201 |
| 2006/0015608 A1 | | 1/2006 | Becker et al. | |
| 2007/0198997 A1 * | | 8/2007 | Jacops et al. | 719/328 |
| 2007/0244571 A1 * | | 10/2007 | Wilson et al. | 700/11 |
| 2008/0036593 A1 * | | 2/2008 | Rose-Pehrsson et al. | 340/540 |
| 2008/0228908 A1 * | | 9/2008 | Link et al. | 709/223 |
| 2009/0204977 A1 * | | 8/2009 | Tavares et al. | 719/318 |

* cited by examiner

*Primary Examiner* — Kristie Shingles
(74) *Attorney, Agent, or Firm* — Toler Law Group

(57) ABSTRACT

This invention relates to a network management system accelerated event channel. This invention also relates to a method and computer program product for controlling an accelerated event channel in a network management system. The network management system comprising: a probe for intercepting a system event from a monitored system and creating an event item or modifying an event item associated with the system event; a collection database server collecting, in database of event items, a new event item or modification to an existing event item; a client; a notifying means for notifying a client of the new event item or event item modification; a channel table for storing an association between a channel and a client id; and wherein the probe associates the event item with a channel and the notifying means uses the channel table to find the client association.

21 Claims, 4 Drawing Sheets

NETWORK MANAGEMENT SYSTEM ACCELERATED EVENT CHANNEL

This invention relates to a network management system accelerated event channel. This invention also relates to a method and computer program product for controlling an accelerated event channel in a network management system.

BACKGROUND

A network management system (NMS) collects enterprise-wide event information from multiple network data sources and presents a simplified view of this information to end users. Referring to FIG. 1 the NMS manages the event information for: assignment to operators; passing on to helpdesk systems based on a relational database management system (RDBMS); logging in a database such as a helpdesk customer relationship management system (CRM); replicating on a remote service level management system; and triggering automatic responses to certain alerts. An NMS also consolidates information from different domain limited network management platforms in remote locations. By working in conjunction with existing management systems and applications, the NMS minimizes deployment time and enables employees to use their existing network management skills.

One enterprise NMS uses a scalable system of more than one periodically replicating ObjectServer to handle enterprise event management. An ObjectServer can collect, aggregate and display events independently or in combination with other ObjectServer and such independent configurability allows high scalability. FIG. 1 shows a known NMS of one ObjectServer managing the events with an additional ObjectServer in a failover configuration. FIG. 2 shows a known NMS of three layers of ObjectServers. It is known to use layer (also called tiered) ObjectServer architecture to coordinate the events where a large number of events impacts the ObjectServer processing capacity. A two layer NMS might have one or more lower ObjectsServers (a collection layer) and an upper ObjectServer (an aggregation and display layer). A three layer NMS (see FIG. 2) has one or more lower ObjectServers (a collection layer); a middle ObjectServer (an aggregation layer) and one or more upper ObjectServers (a display layer). Raw events enter the system and are collected in the collection layer via probes. A probe is a small application process that can read event data feeds from various network devices and elements and write them to an ObjectServer. These events are inserted into a status table of an ObjectServer for processing and forwarding. ObjectServers at different layer are connected together via gateways. It is via these gateways that events are progressed from the lower layers, through the middle layer, to the upper layers.

In an enterprise NMS events are not pushed to the gateway immediately as they occur but are batched up and pulled to a client periodically on a update cycle called a granularity window. The granularity window or period of the update cycle can be changed by the user. In a large and busy system the update cycle period can be set to 30 seconds or more.

A general description of event progression through a three layered NMW is presented below with reference to FIG. 2.

In the collection layer, raw events from a managed network element are received by a probe. Each raw event intercepted by a probe is changed into an ObjectServer event for operation on an ObjectServer status table. An ObjectServer event is one of insertion, deletion, update or cancellation of data in the status table. Clients (both gateway and end user applications) register interest for certain types of ObjectServer event with the ObjectServer. Periodically, and after one or more ObjectServer events operate on the status table, a change message is generated by the ObjectServer and transmitted to all interested clients. For instance, a gateway for an aggregation ObjectServer has registered interest in all ObjectServer events operating on the status table. On receipt of a periodic change message from the ObjectServer, the gateway will request a change reference data set of ObjectServer events for the last period. The change reference data set references the change data but does not comprise the change data. The received change reference data set is used by the client to fetch all or part of the change data (e.g. a complete row from the status table or selected columns from the status table). The gateway may then replicate all changes defined in the change data set on the client database or ObjectServer database, for example, the aggregation ObjectServer.

As events from the gateway are inserted into the aggregation ObjectServer, the aggregation ObjectServer generates a further change event for all interested parties. The event is propagated from the aggregation layer ObjectServer to a display layer ObjectServer via an associated gateway.

In the display layer, event changes in this layer are propagated to the end users' desktops such as a network operator. The propagation from display layer ObjectServers to the desktop is achieved using the same replication strategy as that used by the gateways within the collection and aggregation layers.

Though a layered architecture provides sufficient scalability by the provision of periodic replication acting as a form of load balancing, it does introduce additional delay in event notification to the operator attached to the display layer. In a large deployment of the EMS, the time taken to display critical events to a network operator, from source to the operator front-end is the same as that for any other event in the system. From the perspective of the system, all events had equal status. Assuming a three layer deployment with an update cycle period of 30 seconds at each level of the structure, then an event, once it has entered the system, will be visible to the end user in approximately 90 seconds. In some environments it is desirable to present a subset of events to operators in a shorter amount of time.

U.S. Pat. No. 6,131,112 describes a process called a gateway between a Network Management Platform (NMP) and a System Management System (SMP). The gateway allows for the exchange of event/alarms between the two systems for the benefit of cross-functional correlation. A system is described by which events can be examined for interest via a form of filtering or user defined policy and then passed onwards to a secondary system. All events destined for the secondary system are regarded as equal as they are pushed to the destination system using the same process and path.

US patent publication 2006/0015608, discusses the concept where events from resources which are known to be down due to maintenance are suppressed. System maintenance windows for a resource can be defined, where during this window any failure event related to that resource will be suppressed and ignored during the defined window.

Therefore, when dealing with large amounts of raw events, periodic notification and replication is necessary to organise the raw events and ensure that they are processed and distributed in an efficient manner. The volume of raw events and the periodic notification requires an ordered processing of the events and resulting in all events being processed in approximately the same manner and time. However, there is a need for some events to be processed quicker than the average time.

In an existing periodic notification and replication system, the destination client for each event is set by an individual probes when an event is detected. There is a need for accelerated events to be routed to destinations independent of that determined by a probe.

SUMMARY OF INVENTION

According to one or more aspects of the present invention there are provided method, system and computer program product claims as set out in the claim section of this specification.

Any event recorded in an ObjectServer, and identified as being critical, results in a priority message being pushed to client that is registered in the channel table. Furthermore, the contents of the priority message include a summary field list and an event key that are also registered in the channel table. The summary field list provides sufficient information on the event for context to be determined by a client. The summary field list is targeted at desktop facing clients, such as a notification popup client. The event key is for pulling all of the event details for the process of forwarding an event to the next layer. The event key is targeted at replication based clients such as the gateway. When a priority message is pushed out, a gateway or client will pull all of the required event details from the ObjectServer using the event key. A gateway will then forward the critical event details to the next ObjectServer.

Therefore, the solution provides a mechanism for fast tracking critical events, as defined by the user, using a priority pathway to a client, without interfering with the normal processing pathway for all other events within the system.

The display layer and aggregation layer ObjectServers use the same logic as that used by the collection layer ObjectServers to fast track the event. This logic can be viewed as a cascade of the acceleration actions between ObjectServers and can be configured independently with each Object Server if required.

DESCRIPTION OF DRAWINGS

Embodiments of the invention will now be described, by means of example only, with reference to the accompanying drawings in which.

DESCRIPTION OF THE EMBODIMENTS

Event Management System

Figure 1:
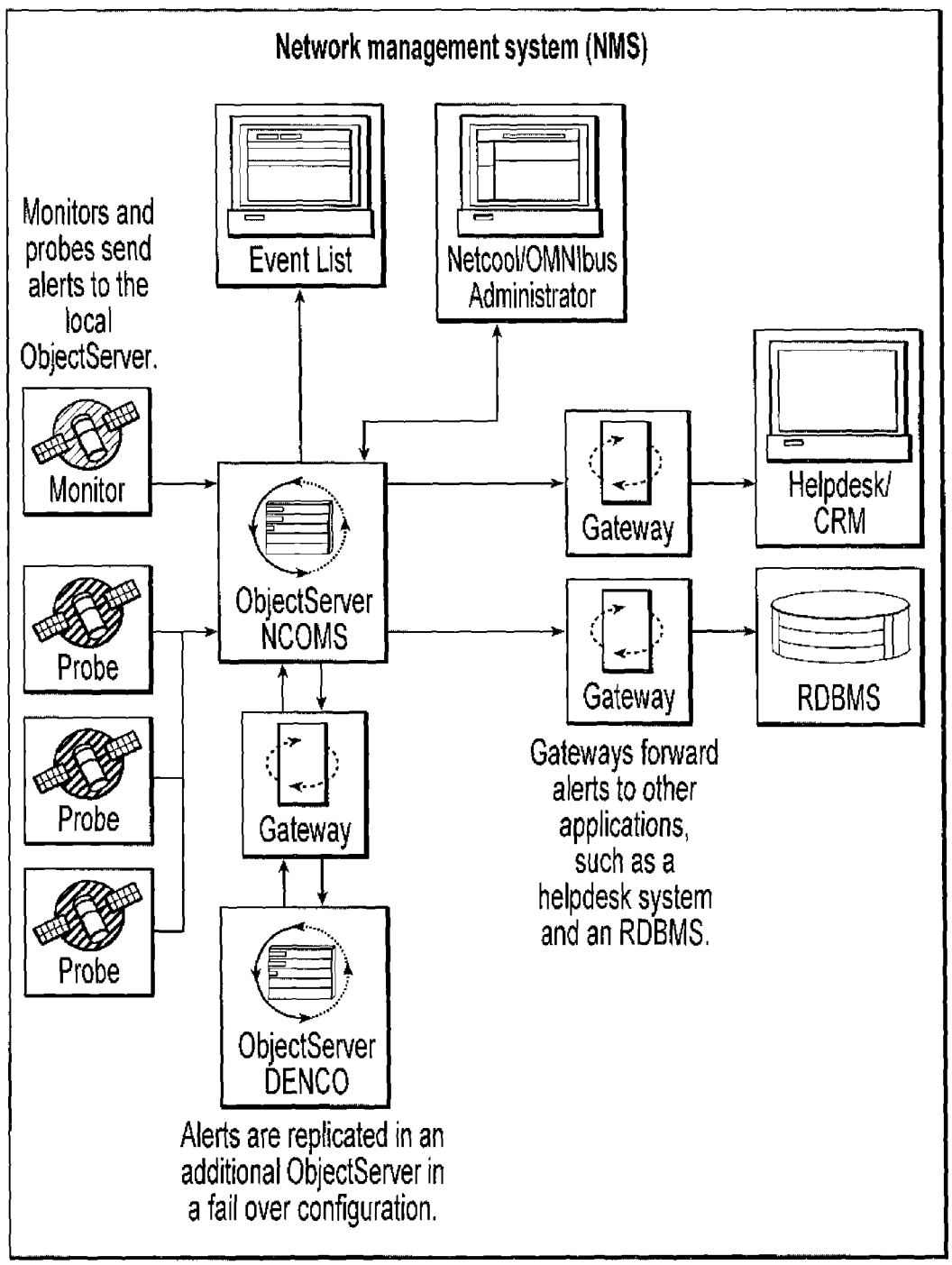
FIG. 1 is a component diagram of a known Network Management System (NMS) of one ObjectServer managing the events with an additional ObjectServer in a failover configuration.

FIG. 1 is a component diagram of a known Network Management System (NMS) of one ObjectServer managing the events with an additional ObjectServer in a failover configuration. The NMS comprises: a first and second ObjectServer connected by a first gateway; three Probes connected to the first ObjectServer; an end user event list connected to the first ObjectServer; an end user administrator connected to the first ObjectServer; an end user helpdesk CRM connected via a second gateway to the first ObjectServer and a relational database management system (RDBMS) connected via a third gateway to the first ObjectServer.

A probe connects to an event source to detect and acquire event data; the probe then inserts the data to an ObjectServer as an alert. Probes use the logic specified in a rules file to manipulate the event elements before converting them into an alert record for insertion as an event record in an ObjectServer status table. Each probe is uniquely designed to acquire event data from a specific source. Probes can acquire data from any stable data source, including devices, databases, and log files.

Gateways exchange control messages between two ObjectServers or an ObjectServer and another application, such as databases and helpdesk or Customer Relationship Management systems (CRM). A gateway is also used to replicate event records in a status table or to maintain a backup ObjectServer. A gateway is also used to archive event records to a database. Once a gateway is correctly installed and configured, the transfer of event records is transparent to operators.

Desktop tools are an integrated suite of graphical tools used to view and manage alerts, and to configure how alert information is presented. Event information is delivered in a format that allows users to quickly determine the availability of services on a network. When an event cause has been identified, desktop tools enable users to resolve problems quickly. A basic desktop tool is the event list but others tools include: a filter builder; a view builder; and an administrative client. These applications retrieve information from an ObjectServer and allow the current state of the database to be viewed, which in turn reflects the status of the systems being managed.

The event list displays a filtered view of alerts in a scrolling list that may be color-coded. Multiple event list clients can be set up, each with different priorities and filters. The event list can be used to reprioritize alerts and to assign or reassign problems to other users. When an alert has been assigned to a user, the user can acknowledge it, or deacknowledge it so that it can be picked up by another user.

Filters enable selection of which alerts to display in the event list. The Filter Builder allows building of simple or complex alert filters. An element inspector enables regular expressions to be added to conditions.

The view builder configures the list of columns in which the operator is interested (view).

An administration client enables administrators to configure and manage ObjectServers.

Figure 2:
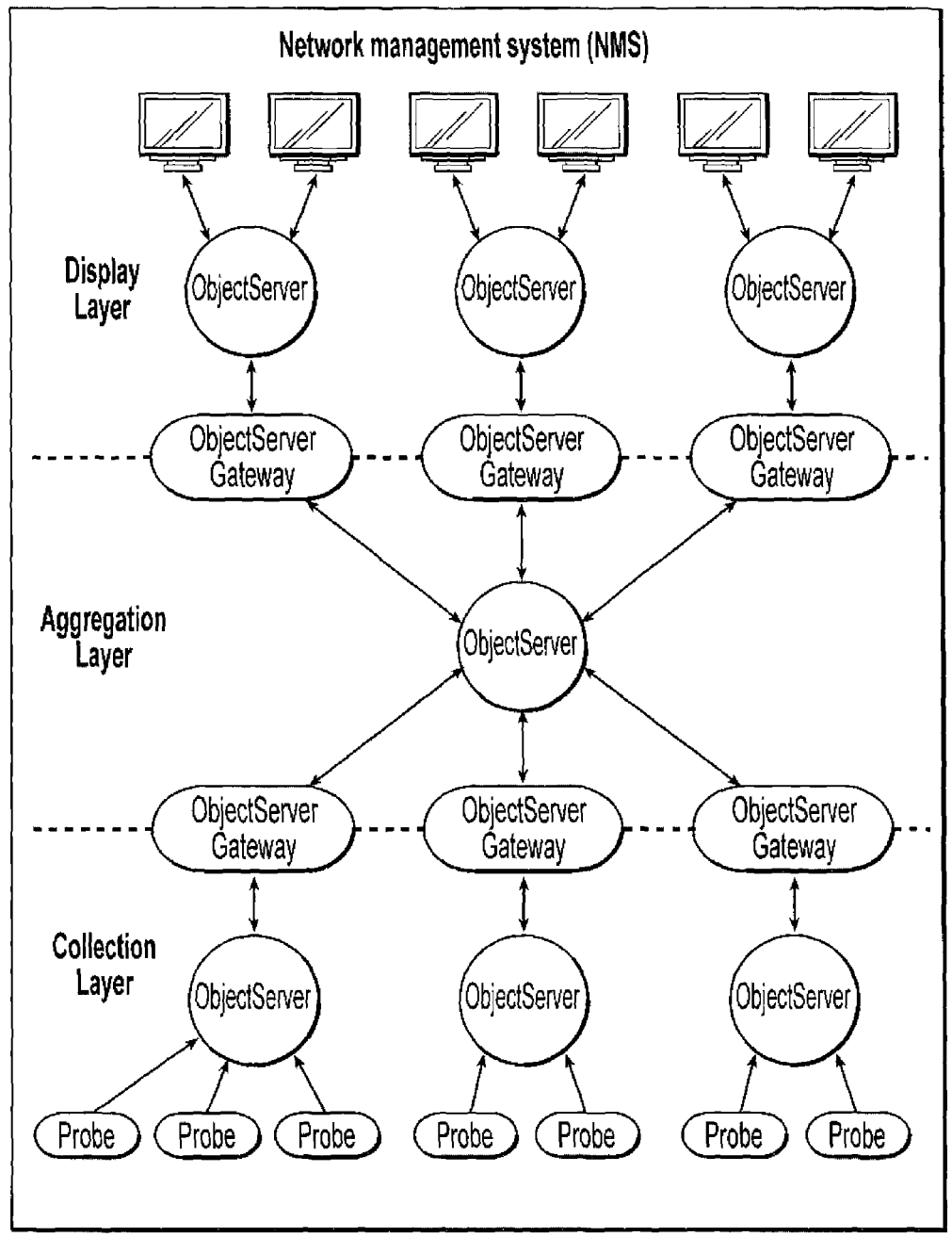
FIG. 2 is a component diagram of a known NMS having three layers of ObjectServers.

FIG. 2 shows a more typical configuration of an Enterprise NMS comprising a plurality of clients connected, two or more to ObjectServers in a display layer. Each of the ObjectServers is connected through a gateway to an ObjectServer in an aggregation layer. The ObjectServer in the aggregation layer is connected through gateways to respective ObjectServers in a collection layer. Each of the ObjectServers in the collection layer are connected to one to one or more probes.

ObjectServer

Figure 3:
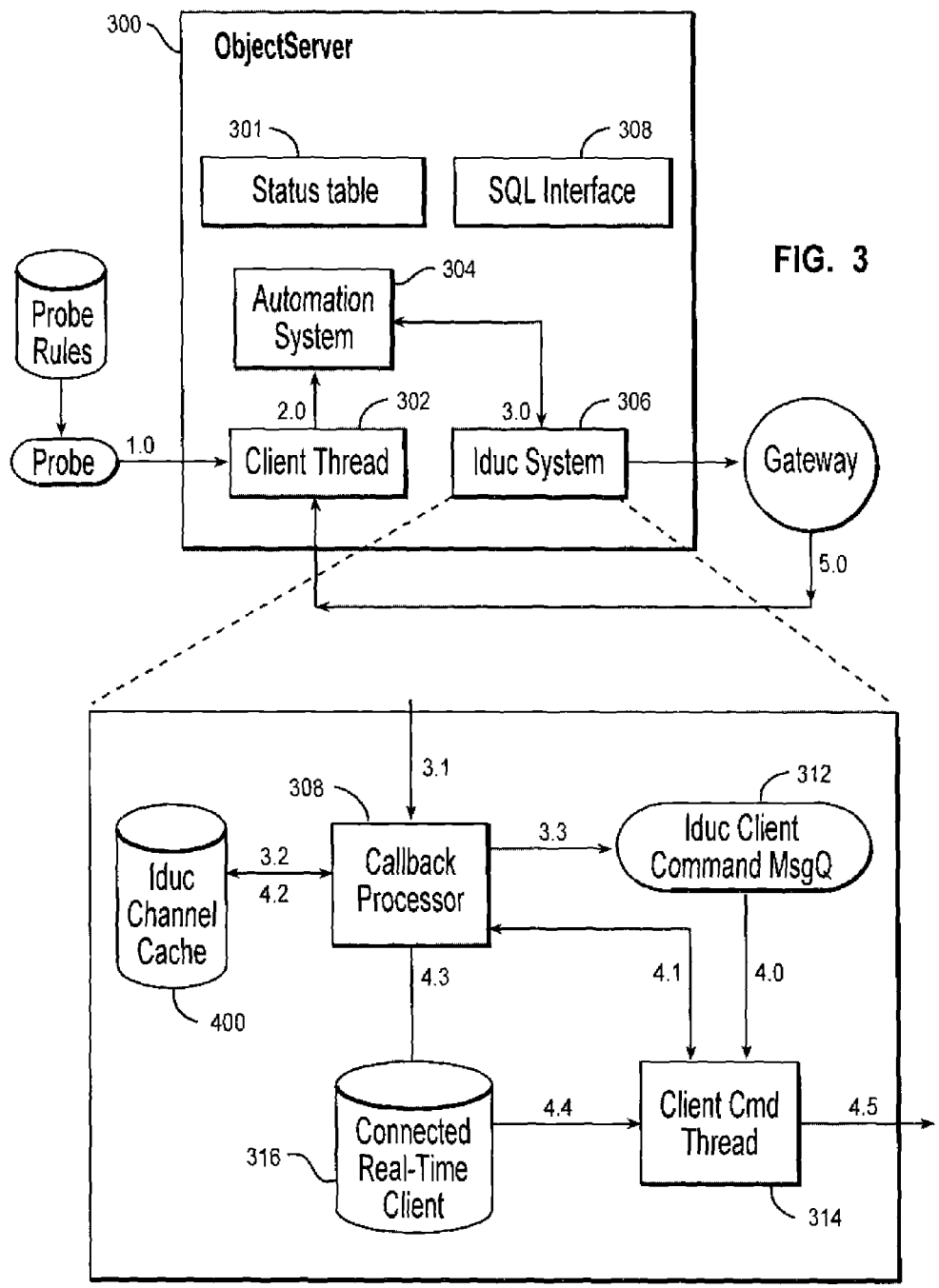
FIG. 3 is a component diagram of an ObjectServer of the present embodiment and including process flow between components.

FIG. 3 shows an ObjectServer 300 of the preferred embodiment in the collection layer connected between one or more probes and a single gateway. The ObjectServer 300 comprises: a status table 301; a client thread processor 302; an automation system 304; an Insert Delete Update Control system (IDUC) 306; and an SQL interface 308. The ObjectServer is an in-memory database server at the core of the NMS. Event records are inserted directly into the ObjectServer from external programs such as probes, monitors, and gateways, stored and managed in status tables, and ultimately forwarded and displayed in a client event list.

The status table 301 is a database in an ObjectServer for storing data about events. One field of the status table is a priority event flag. Data is inserted and retrieved from the status table 301 using the SQL commands through the SQL interface 308. Although, in the preferred embodiment the database is described as a table it is not limited to this format and the invention could be expressed in any other database format.

The structured query language (SQL) interface 308 allows for the defining and manipulating of relational database objects such as tables and views. The SQL interactive interface can be used to connect to, interact with, and control an ObjectServer. The SQL interactive interface enables tasks such as creating a new database table or stopping the ObjectServer to be performed.

Three extension SQL commands are defined for processing by the IDUC System: SQL Event Fast Track Command; SQL Action Command Command; and SQL Send Message Command.

The SQL Event Fast Track Command is used to pass a table row to the IDUC System 306 for fast tracking to those clients identified to be parties of interest. The interested parties can be defined via a specific client connection ID or via an IDUC channel name. This results in an event fast track control message being pushed to clients. When the event fast track control message is received by a client it will proceed to fetch the required columns using a "select via" SQL command via the SQL interface. This enables the client gateway to directly access to the row in the status table. The requested event row elements are from the status table to the requesting client.

The SQL Action Command is used to send a client understood command action to a client, or set of clients, or ObjectServer to act upon.

The SQL Send Message Command is used to send a client informational textual messages. The message argument is defined as an expression, as this would allow for messages to be constructed using variables within SQL procedure blocks, rather than just forcing them to be a hard-coded defined value.

The client thread processor 302 is for parsing an SQL command to insert an event record to determine the data to be inserted into the status table and for inserting the event record into the status table.

The automation system 304 comprises a post-insert trigger that ensures that only events that have actually been inserted in a status table can be fast tracked so that such events persist in the server. In a preferred embodiment that fast tracks events in the fastest way, the post-insert trigger looks for critical events within inserted event records by looking for a fast track flag in the event record set by a probe. In another embodiment, the post-insert trigger can apply a more finely tuned filter than that of a probe for more precise fast tracking. On a true resolution of the criteria, the post-insert trigger will send the whole event row to the IDUC system 306 using an SQL Event Fast Track Command (defined in the SQL interface 308). After processing by the IDUC System 306, the event will be fast tracked from the ObjectServer as an IDUC Event Fast Track Control Message. Any row that is pushed out as an Event Fast Track Control message, will have any pending IDUC change data purged in order to prevent, where possible, a duplicate insert within the processing chain.

Event are associated with channels in the post-insert trigger using the SQL Event Fast Track Commen. For instance, if the event is an access violation then all events will be associated with a Security Channel pseudo code
   if event.FastTrack==1
   begin
      if   event.type=accessViolation:   IDUC   EVTFT
         'Security_Channel', insert, new;
   end IDUC System and IDUC Control Messages IDUC Control Messages are sent from the IDUC System between clients and ObjectServers using an IDUC connection. In the present embodiment three IDUC Control Messages are described: Event Fast Track Control Message; Action Command Control Message; and Send Message Control Message.

The Event Fast Track Control Message has two basic characteristics. Firstly, the message contains a fully descriptive key that would allow the client to relate the notification back to the original row, so that the details of the full event can be fetched, if and when required. Secondly, the message contains a sufficiently summarized description, so that sense can be made of the message without fetching additional details from the server. This second characteristic is a necessity for an end-user notification client pop-up tool. The aim of such a tool is to inform a user of a particular event of interest in the fastest possible time. Pushing a sufficient summary out within the message allows to this be done in a more efficient manner and therefore increases the potential throughput of the system. The fetching of the events' full details can be delayed until a user decides they wish to see them.

An Action Command Control Message provides a structured means of sending a command to a client that it should act upon. The command may have come from another client. The meaning of the command is unknown within the IDUC system and must be interpreted and understood by the client itself in order for it to perform the action required. As the interpretation is a client responsibility, the action command body is treated as a byte data block. The action command control payload is defined below.

A Send Message Control Message provides a structured means of sending an informational message to a client, such as messages of the day, system maintenance windows and operational problems. The only action a client needs to perform on receipt of the message is to display the text of the actual message to the end-user in an appropriate way.

The IDUC system 306 comprises: callback functions 308; client command message queue 312; client command thread processor 314; a connected real-time client 316; and IDUC channel cache 400

The callback functions 308 are used to access the data of the channel cache 400. The following callback functions are defined: resolution callback; execution callback; pre-processing callback; pre-send callback; format callback; post-send callback; and post-processing callback.

The resolution callback (3.1) validates the nature of the fast track request and obtains a handle to all of the processing elements.

The execution callback (3.2) constructs the Event Fast Track Control Message.

The pre-processing callback (4.4.1) is used by the application to setup any required data elements for processing the set of client destinations.

The pre-send callback (4.4.2.1) is used by the application to setup any required data elements for the processing of the current client destination.

The format callback (4.4.2.2) is used by the application to perform any specific formatting of the message payload that is to be delivered to the client, such as character set conversion.

The post-send callback (4.4.2.4) is used by the application to clean-up any data elements setup for the current client it the pre-send or format callbacks.

The post-processing callback (4.4.3) is used by the application to clean-up any data items that were setup for processing the destination client set.

The client command message queue 312 holds command messages before passing them to the client command thread processor 314.

The client command thread processor 314 is responsible for resolving and delivering IDUC Control Messages to the required destination clients. The command thread processor 314, via the callback functions 308, uses IDUC channel tables 400 to determine which clients are interested in which control messages. In order to prevent continual walks of these tables, an internal memory cache of the table contents is built, so that it can use additional indexes on the data. Additionally, post-insert, update and delete triggers are attached to these tables, so that the cache can be kept up-to-date without a full refresh where possible.

The connected real-time client list 316 provides a detailed entry on each fully established IDUC connection. Once a handle to the channel table 400 has been obtained, the resolution callback walks the connected real-time client list. For each real-time client entry, the user, hostname, application name and application description components are compared with one or more channel interest entry in order to determine whether this client is interested in the given IDUC client command. Each client ID that is matched is added to the client ID list that is returned to the IDUC client command thread.

The IDUC channel cache 400, also referred to as IDUC Channel Tables 400, stores client interest details in tables. IDUC Channel Tables 400 can be regarded as a definition of an interest group, as it defines the real-time clients that are interested in a given IDUC Control Message. The available IDUC channels are defined by an administrative user via the standard OMNIbus configuration GUI. This keeps the configuration central to the ObjectServer itself and requires little configuration within the clients themselves. If a client is delivered an IDUC Control Message, it handles it automatically in an expected way for the type of client that it is.

Figure 4:
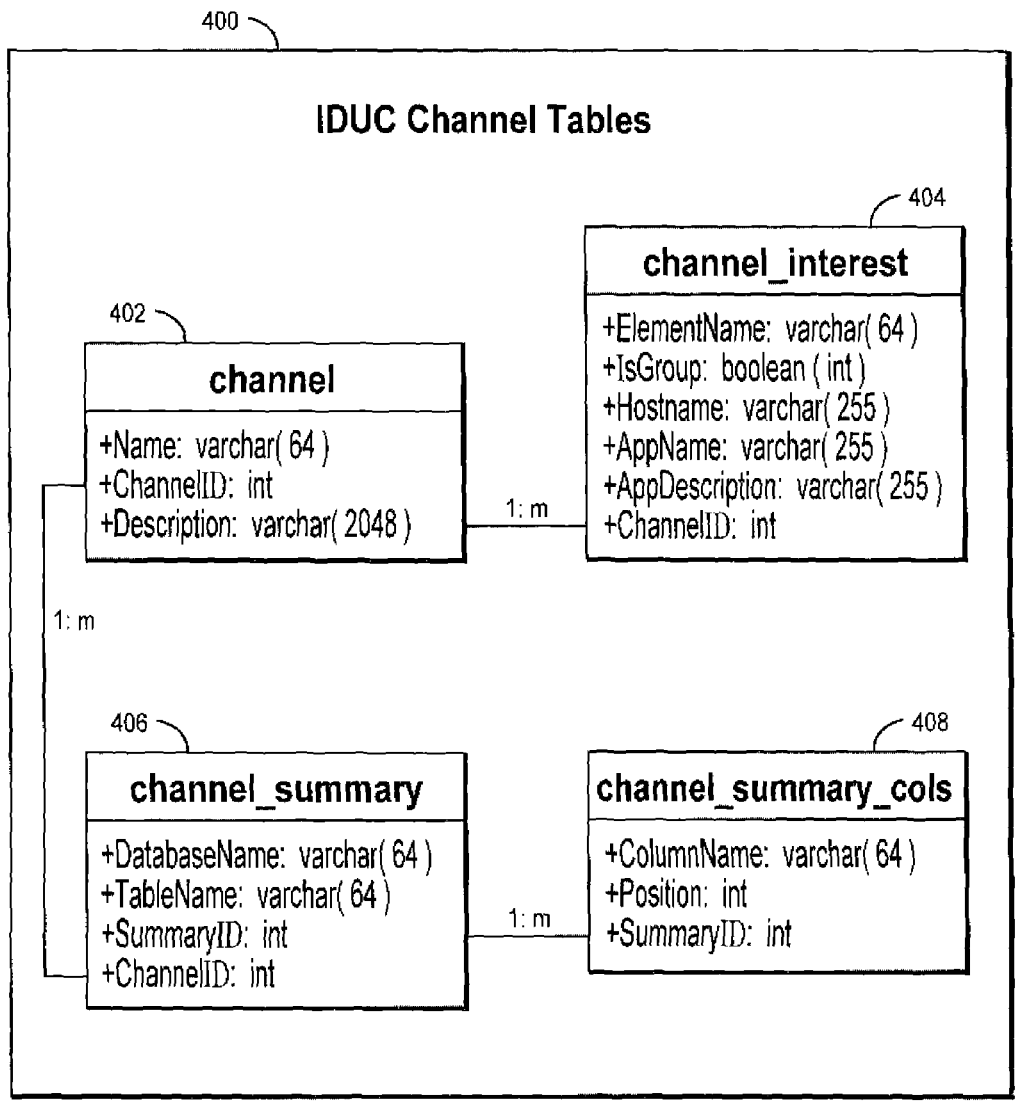
FIG. 4 is a table diagram showing the contents and relationships of channel tables.

Referring to FIG. 4, details of the available IDUC Channels are stored within a set of four channel tables: channel 400; channel_interest 402; channel_summary 404; and channel_summary_cols 406. These tables are located in each ObjectServer in the name space iduc_system. Any further IDUC related support tables will be added to this database going forward. The details of each channel are described via four tables as presented in FIG. 4.

iduc_system.channel defines the set of known iduc channels within the ObjectServer. An integer foreign key, ChannelID, is added for a more efficient reference to details of the channel stored in the associated tables.

iduc_system.channel_interest stores a channel interest for a given channel. Each entry can be regarded as a composite filter where an IDUC capable client that is interested in a given channel can be defined as a combination of its hostname, application name, application description and/or its username. A value need not be provided for every column. Any column that contains the empty string, is regarded as a non-relevant component to the resolution. All columns, other than the ElementName column, can define the required filter criteria as a regular expression. There can be multiple interest entries per channel. Enabling the user to have as many interest descriptions as possible to define the set of interested client parties.

iduc_system.channel_summary is only utilized for an Event Fast Track Control Message whereas channel and channel interest are used in normal processing. This column defines the summary details of a specific table within the ObjectServer itself. An integer foreign key, SummaryID, is added for a more efficient reference to the summary columns table. As rows from any table in the ObjectServer can be fast tracked, this table enables a channel to be associated to multiple tables that may have events fast tracked.

iduc_system.channel_summary_cols stores details on the exact columns that make up the actual summary for a given table. The name of the column and its position in the summary order is specified for each column that is part of a given summary definition presented in the channel summary table.

The channel tables are of particular usefulness for priority events but they can also be used for events that are propagated in the periodic batch update.

An operational use case of a IDUC fast tracked event is now described using steps referenced in FIG. 3.

Step 1. A probe receives a raw event from the source system that it is monitoring. This raw event is passed through the probes current rules file. A conditional within the rules may identify this event to be a critical customer/system issue. The raw event is packaged up into an SQL Fast Track Event Command and delivered to the ObjectServer.

Step 2. The SQL Fast Track Event Command is received and processed within the client thread processor 302. The SQL Fast Track Event Command is parsed by the command parser, checked for validity and then the event is inserted into the event in the status table.

Step 3. The post-insert trigger detects that the event has been inserted into the status table. A conditional within the automation system examines the value of the fast track field and requests that the IDUC system fast track the event.

Step 3.1. The IDUC system validates the nature of the fast track request and obtains handles to all of the processing elements.

Step 3.2. The callback processor constructs a control message fully describing the request and the event. This command request is fully descriptive, in terms of message content. The channel definition for fast tracking this event is located within the cached data of the IDUC channels if the request contains a channel name. If no channel is located then the request is dropped. However, if the request is to a specific client ID, then a default channel is used. The summary field list associated with the status table and the channel is also located within the channel cache. If no summary list is defined for the status table containing the event, then the primary key list for the table becomes the summary field list.

Step 3.3. The fast track message is constructed using the located channel definition, the primary key list, the summary field list element and the event data from the status table using the row handle. The Event Fast Track Control Message includes a pre-constructed IDUC change set (for a single event), which is stored in the user data reference of the request. A Change set is a shortand description of what has happened to an event during the IDUC update cycle. For example the event may have been received, then received again, then received again but with one or more attributes changed from their initial values so the change set may look like insert, insert, update, update (along with the corresponding values) Bringing all the elements together into one command allows processing without reference to the source row. The priority command is stacked on the Client command message queue 313 as a priority command.

Step 4.0 The priority command is sent to the client command thread processor 314 from the client command message queue 312.

Step 4.1 The priority command is received and processed. The received priority command is self-descriptive but the client command thread processor 314 needs to resolve the set of destination client IDs. Resolution of the IDs and processing of the command is achieved via a set of ObjectServer defined callbacks. Firstly, the client IDs of all destination clients are resolved. The client command thread processor 314 resolves this list by calling a resolution function in the callback processor 308. This allows the client command thread processor 314 to callback into the application without having to know what it is or how to resolve the destination list.

Step 4.2. The resolution function in the callback processor looks up the IDUC channel name within the cached channel data 310, so that the resolver has a handle to the channel interest list. Refer to step 3.2 for details.

Step 4.3. Once a handle to the channel interest list has been obtained the resolution callback function walks the connected real-time client list. Each entry in this list provides details on each fully established IDUC connection that is paired with a connection. For each real-time client entry, the user, hostname, application name and application description components are compared with each channel interest entry in order to determine whether this client is interested in the given IDUC client command. For each client that is matched, the client ID is added to the client ID list that is returned to the client command thread. If the list of destination IDs that are returned to the client command thread is empty, the fast track message processing ends and a success status is returned. If the list is not empty, the thread proceeds to build the client event fast track IDUC command message payload.

Step 4.4. After building the message payload, the following processing steps are performed.

Step 4.4.1. Call the application installed IDUC client command pre-processing callback. This callback can be used by the application to setup any required data elements for processing the set of client destinations.

Step 4.4.2. Using the connected real-time client list, each client ID in the destination list is looked up.

Step 4.4.2.1. Call the application installed client message pre-send callback. This callback can be used by the application to setup any required data elements for the processing of the current client destination.

Step 4.4.2.2. Call the application installed client message format send callback. This callback can be used by the application to setup any required data elements for the processing of the current client destination. This callback can be used by the application to perform any specific formatting of the message payload that is to be delivered to the client, such as character set conversion. This allows the payload to be delivered to the client in a reliable way. In the ObjectServer, this callback uses known character set conversion routines to convert the payload message from the character set of the ObjectServer to the character set of the client.

Step 4.4.2.3. Build the full event fast track IDUC control message with the formatted payload and send it to the client via its IDUC connection.

Step 4.4.2.4. Call the application installed client message post-send callback. This callback can be used by the application to clean-up any data elements setup for the current client it the pre-send or format callbacks. This callback is used by the ObjectServer to add the current clients ID to an IDUC change set that will be used to remove any pending IDUC for the fast tracked insert, update or delete.

Step 4.4.3. Call the application installed IDUC client command post-processing callback. This callback can be used by the application to clean-up any data items that were setup for processing the destination client set. The ObjectServer uses this callback to apply the current IDUC change set to remove any pending IDUC for the fast tracked event for any client that the message was successfully sent to.

Step 5. The ObjectServer gateway reader receives the fast track event. It extracts the rows primary key column values and constructs an appropriate "select via" SQL command to fetch the value of all of the columns that it requires. The returned results set is incorporated into a simulated IDUC data processing structure and sent to the writer as a high-priority message. The writer processes the high-priority message as soon as it can get it from the queue as the next message. The fast tracked event is inserted into the destination ObjectServer and delivery is complete. If the destination client reader is a notification tool, the event summary would be displayed as is from the message. There is no return trip to the ObjectServer unless further details of the event are required. At this point the events primary key column value can be used.

EXAMPLE

An event fast track control message payload is defined below with an example. The summary column list is a user defined component that defines which data elements are used from the status table to make up the payload.

"s:evtft:<channel_name><action_type><src_table>: <primary_key><summary_cols>"

where:—

"s:evtft:" is the generic code that represent an event fast track control message and that what follows is an event fact track string containing payload expression.

"<channel_name>" is the name of the channel definition which is inserted into the control message.

"<action_type>" is the type of action that is performed on the event record. The types are: "I" for insert; "U" for update; and "D" for delete.

"<src_table>" defines the status table where the fast track event occurs. The form of the definition is "<db_name>.<tbl_name>" where "<db_name> is the database name and <tbl_name> is the table name.

"<primary_key>" defines the columns in the status table that the fast track operates on. The form of the <primary_key> is <col_num>.<col_list>.

"<summary_cols>" defines the subset (summary) of columns in the status table that are sent in the control message. The form of the <primary_key> is <col_num>.<col_list>.

"<col_num>" is the number of columns in the primary key or the summary.

"<col_list>" is of the form

"<col_name>:<col_type>:<col_value><col_value_end>"

"<col_name>" is a text name.

"<col_type>" is S for String or I for Integer

"<col_value>" is the column value converted to string.

"<col_value_end>" and "<value_end>" are the delimiter characters "ˆ[ˆH" (control character sequence 0x08b1)

Other Embodiments

It will be clear to one skilled in the art that the method of the present invention may suitably be embodied in a logic apparatus comprising logic means to perform the steps of the method, and that such logic means may comprise hardware components or firmware components. For instance, FIG. 3 shows both a logic and method embodiment.

It will be equally clear to one skilled in the art that the logic arrangement of the present invention may suitably be embodied in a logic apparatus comprising logic means to perform the steps of the method, and that such logic means may comprise components such as logic gates in, for example, a programmable logic array. Such a logic arrangement may further be embodied in enabling means for temporarily or permanently establishing logical structures in such an array using, for example, a virtual hardware descriptor language, which may be stored using fixed or transmittable carrier media.

It will be appreciated that the method described above may also suitably be carried out fully or partially in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

The present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems.

Further, such instructions may be stored using any memory technology, present or future, including but not limited to, semiconductor, magnetic, or optical, or transmitted using any communications technology, present or future, including but not limited to optical, infrared, or microwave.

It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

While it is understood that the process software xxx may be deployed by manually loading directly in the client, server and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will, select the proxy server code, determine on which computers to place the proxy servers' code, transmit the proxy server code, then install the proxy server code on the proxy computer. The process software will be transmitted to the proxy server then stored on the proxy server.

The process software is integrated into a client, server and network environment by providing for the process software to coexist with applications, operating systems and network operating systems software and then installing the process software on the clients and servers in the environment where the process software will function. The first step is to identify any software on the clients and servers including the network operating system where the process software will be deployed that are required by the process software or that work in conjunction with the process software. This includes the network operating system that is software that enhances a basic operating system by adding networking features. Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level. After ensuring that the software, where the process software is to be deployed, is at the correct version level that has been tested to work with the process software, the integration is completed by installing the process software on the clients and servers.

The process software is shared, simultaneously serving multiple customers in a flexible, automated fashion. It is standardized, requiring little customization and it is scalable, providing capacity on demand in a pay-as-you-go model. The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc. When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to effect the performance of that server, other servers are accessed to increase the capacity and to share the workload. Likewise when other measurements of use such as network bandwidth, memory usage, storage usage, etc. approach a capacity so as to effect performance, additional network bandwidth, memory usage, storage etc. are added to share the workload. The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider. In another embodiment, the service provider requests payment directly from a customer account at a banking or financial institution. In another embodiment, if the service provider is also a customer of the customer that uses the process software application, the payment owed to the service provider is reconciled to the payment owed by the service provider to minimize the transfer of payments.

The process software may be deployed, accessed and executed through the use of a virtual private network (VPN), which is any combination of technologies that can be used to secure a connection through an otherwise unsecured or untrusted network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elswhere) wherein the lifetime of the VPN is limited to a given period of time or a given number of deployments based on an amount paid. The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software. When using the site-to-site VPN, the process software is deployed, accessed and executed through the use of dedicated equipment and large-scale encryption that are used to connect a companies multiple fixed sites over a public network such as the Internet. The process software is transported over the VPN via tunneling which is the process the of placing an entire packet within another packet and sending it over a network. The protocol of the outer packet is understood by the network and both points, called tunnel interfaces, where the packet enters and exits the network.

The invention claimed is:

1. A computer implemented method comprising:
   receiving, at an object server, a structured query language (SQL) fast track command from a probe, wherein the SQL fast track command includes an event record based on a first occurrence of a system event of a network intercepted by the probe and a fast track flag settable by the probe;
   storing the event record and the fast track flag as an event item at a database of event items;
   determining whether the fast track flag of the stored event item is set after storing the event item; and
   in response to a determination that the fast track flag of the stored event item is set:
      initiating a pre-processing callback procedure that is provided by a first client software application, the pre-processing callback procedure to format the stored event record for use by the first client software application; and
      sending a direct notification from the object server to the first client software application, the direct notification including a description of the system event and a primary key associated with the stored event record, the primary key enabling the first client software application to retrieve the event record from the database.

2. The method of claim 1, further comprising:
   when the fast track flag is determined to not be set:
      creating a batch notification that includes the event record of the stored event item and includes other event records of other event items stored at the database of event items within a particular time period; and
      sending the batch notification from the object server to a second client software application to instruct the second client software application to send the batch notification to the first client software application in response to receiving the batch notification.

3. The method of claim 1, further comprising receiving from the probe a notification of a second occurrence of the system event at the object server.

4. The method of claim 3, further comprising:
   retrieving the event item associated with the system event from the database of event items;
   modifying the event item based on the second occurrence of the system event; and
   storing the modified event item at the database of event items.

5. The method of claim 4, further comprising sending a second direct notification to the second client software application, the second direct notification including a second description of the second occurrence of the system event and a second primary key associated with the stored modified event item, the second primary key enabling the second client software application to retrieve the modified event item from the database of event items.

6. The method of claim 5, further comprising:
   creating a second batch notification that includes the modified event item and includes other modified event items stored at the database of event items that are modified within a second particular time period; and
   sending the second batch notification to the first client software application.

7. The method of claim 1, wherein the system event includes an access violation associated with the network.

8. The method of claim 1, wherein the system event is associated with a processing capacity associated with the network.

9. A network management system comprising:
   a database capable of storing event items; and
   an object server to:
      receive a structured query language (SQL) fast track command from a probe, wherein the SQL fast track command includes an event record based on a first occurrence of a system event in a network monitored by the probe and a fast track flag settable by the probe when the system event is a critical event;
      create an event item associated with the system event in response to receiving the SQL fast track command, wherein the event item includes the event record and the fast track flag;
      store the event item at the database;
      determine whether the fast track flag of the stored event item is set after storing the event item; and
      in response to a determination that the fast track flag of the stored event item is set:
         initiate a pre-processing callback procedure, the pre-processing callback procedure to format the event item for use by a first client software application, wherein the pre-processing callback procedure is provided by the first client software application; and send a direct notification to the first client software application, the direct notification including a description of the system event and a primary key associated with the stored event item, the primary key enabling the first client software application to retrieve the event item including data associated with the system event from the database.

10. The network management system of claim 9, wherein the object server is operable to, in response to a determination that the fast track flag of the stored event item is not set:
create a batch notification that includes the event item and includes additional event items stored at the database; and
send the batch notification to a second client software application to instruct the second client software application to send the batch notification to the first client in response to receiving the batch notification.

11. The network management system of claim 9, further comprising the probe, wherein the probe determines that the system event is the critical event by determining whether a set of event rules include the critical event.

12. The network management system of claim 9, wherein the object server receives a second notification of the system event in the network monitored by the network management system.

13. The network management system of claim 12, wherein the object server is further operable to:
retrieve, from the database, the event item associated with the first occurrence of the system event based at least in part on the second occurrence of the system event;
modify the event item based on the second occurrence of the system event; and
store the modified event item at the database.

14. The network management system of claim 13, wherein the object server is further operable to send a third notification to the second client software application, the third notification including a second description of the second occurrence of the system event and a second primary key associated with the stored modified event item, the second primary key enabling the second client software application to retrieve the modified event item from the database.

15. The network management system of claim 14, wherein the first client software application retrieves the modified event item from the database after receiving the third notification from the object server via the second client software.

16. A computer program product comprising a non-transitory computer readable storage medium having computer readable program code embodied therewith, the computer readable program code comprising:
computer readable program code configured to:
receive a structured query language (SQL) fast track command from a probe, wherein the SQL fast track command includes an event record based on a first occurrence of a system event in a monitored network and a fast track flag settable by the probe when the system event is critical;
create an event item associated with the system event in response to receiving the SQL fast track command, wherein the event item includes the event record and the fast track flag;
store the event item in a database of event items;

determine whether the fast track flag of the stored event item is set after storing the event item; and
in response to a determination that the fast track flag of the stored event item is set:
initiate a pre-processing callback procedure that is provided by a first client software application, the pre-processing callback procedure to format the event item for use by the first client software application; and
send a direct notification to the first client software application, the direct notification including a description of the system event and a primary key associated with the stored event item, the primary key enabling the first client software application to retrieve the event item including the data associated with the system event from the database.

17. The computer program product of claim 16, further comprising:
computer readable program code configured to, in response to a determination that the fast track flag of the stored event item is not set:
create a batch notification that includes the event item and includes additional event items stored at the database of event items; and
send the batch notification to a second client software application, to instruct the second client software application to send the batch notification to the first client software application in response to receiving the batch notification.

18. The computer program product of claim 16, wherein the computer readable program code to determine whether the fast track flag of the stored event item is set after storing the event item comprises:
computer readable program code configured to:
retrieve event rules associated with a plurality of critical events; and
verify the event item is associated with a particular critical event based on the event rules.

19. The computer program product of claim 16, further comprising computer readable program code configured to identify a second occurrence of the system event in the monitored network.

20. The computer program product of claim 19, further comprising:
computer readable program code configured to:
retrieve the event item associated with the first occurrence of the system event based at least in part on the second occurrence of the system event from the database of event items;
modify the event item based on the second occurrence of the system event; and
store the modified event item at the database of event items.

21. The computer program product of claim 20, further comprising computer readable program code configured to send a second notification to the first client software application, the second notification including a second description of the second occurrence of the system event and a second primary key associated with the stored modified event item, the second primary key enabling the first client software application to retrieve the modified event item from the database.

* * * * *